UNITED STATES PATENT OFFICE.

ARNOLD FAITELOWITZ, OF BERLIN, GERMANY, ASSIGNOR, BY MESNE ASSIGNMENTS, TO THE CHEMICAL FOUNDATION, INC., A CORPORATION OF DELAWARE.

METHOD OF PRESERVING VEGETABLES, FRUIT, AND THE LIKE.

1,399,471.      Specification of Letters Patent.      Patented Dec. 6, 1921.

No Drawing.      Application filed May 24, 1917. Serial No. 170,663.

*To all whom it may concern:*

Be it known that I, ARNOLD FAITELOWITZ, chemist, a subject of the Emperor of Russia, and residing at Kurfürstendamm 32, Berlin, Germany, have invented certain new and useful Improvements in Methods of Preserving Vegetables, Fruit, and the like, of which the following is a specification.

For preserving vegetables, fruit and the like two methods have heretofore been mainly employed.

According to the one method the material to be preserved is hermetically sealed in vessels, for example soldered into tins or filled into glass jars which are then sealed by aid of rubber packing, whereupon the contents of such tins or jars was sterilized by heating the latter. Or, according to the other method the greater parts of their contents of water was removed from such materials by drying or evaporating.

The first cited method has, above all, the disadvantage that it is expensive and that owing to the large space required, it is not an easy matter to treat large quantities at a time.

The drying or evaporating method, on the other hand, has the drawback, that the materials undergo a substantial change. So it is difficult to make them swell up again in water, and furthermore, certain components, such as the albumen, undergo a permanent, detrimental change. Components which previously were soluble in water and readily digestible, become insoluble and indigestible. So, for example, dried mushrooms have to remain for 48 hours in contact with water for them to swell up to a sufficient degree.

According to the present invention vegetables, fruit and the like shall be made durable without the hereinbefore stated disadvantages and drawbacks appearing. For attaining this object the juice of the vegetables, fruit or the like, after the latter have, if desirable been boiled, is separated therefrom for example by means of a filter press. The juice thus obtained is thereupon condensed at as low a temperature as possible, if necessary *in vacuo*. Thereupon this condensed juice is again mixed to the pulp remaining from the preceding separation, for example the press cake. The vegetables, fruit or the like may be reduced to small pieces before the juice is separated therefrom, or the remaining pulp may be cut up in such a manner.

By the juice being condensed after having been separated from the pulp, it is brought about that the pulp need not be exposed for any length of time to a high temperature, so that detrimental changes of the color, or of the fibers or other component parts of the pulp are avoided.

Owing to its high percentage of salts and sugar the condensed juice will have a preserving effect on the whole mixture. The durability of the material thus obtained will, however, as a rule, not be sufficient for all purposes. For this reason the said durability is further increased in the following manner:

The mixture of juice and pulp is molded into blocks or other forms and these are then submitted to the action of a hot current of air. Thereby a thin dried film is formed on the said blocks, which film incloses the still moist body and completely protects it against deterioration.

I claim:

1. Method of preserving fresh vegetables, fruit and the like consisting in separating the juice from said vegetables, fruit and the like, condensing said juice and thereupon mixing said condensed juice again with the pulp obtained by said separation.

2. Method of preserving fresh vegetables, fruit and the like consisting in separating the natural juice from said vegetables, fruit and the like, condensing said juice, mixing said condensed juice again with the pulp obtained by said separation, molding said mixture into blocks and superficially drying the same.

3. Method of preserving fresh vegetables, fruit and the like consisting in separating the natural juice from said vegetables, fruit and the like, condensing said juice, mixing said condensed juice again with the pulp obtained by said separation, molding said mixture into blocks, and exposing said blocks to the action of hot air adapted to produce a film of dried matter inclosing the main body of said blocks.

4. Method of preserving fresh vegetables, fruit and the like consisting in separating the juice from said vegetables, fruit and the like, reduced to small pieces, condensing the said juice and thereupon mixing said condensed juice again with the pulp obtained by said separation.

5. Preserves consisting of a mixture of condensed natural juice separated from fresh vegetables, fruit and the like and the remaining pulp.

6. Preserves in the form of blocks consisting of a mixture of condensed natural juice separated from fresh vegetables, fruit and the like and the remaining pulp, the main body of said blocks containing sufficient moisture to allow of the swelling-up and dissolving of its previously swellable and soluble components, respectively, and being inclosed by a dried film of the same substance.

In testimony whereof I have hereunto set my hand in presence of two subscribing witnesses.

Dr. ARNOLD FAITELOWITZ.

Witnesses:
 HENRY HASPER,
 ALLEN F. JENNINGS.